(12) United States Patent
Werner

(10) Patent No.: US 11,820,080 B2
(45) Date of Patent: *Nov. 21, 2023

(54) APPARATUS FOR ADDITIVELY MANUFACTURING THREE-DIMENSIONAL OBJECTS

(71) Applicant: Concept Laser GmbH, Lichtenfels (DE)

(72) Inventor: Jürgen Werner, Lichtenfels (DE)

(73) Assignee: CONCEPT LASER GMBH, Lichtenfels (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/747,254

(22) Filed: May 18, 2022

(65) Prior Publication Data

US 2022/0274324 A1    Sep. 1, 2022

Related U.S. Application Data

(63) Continuation of application No. 16/274,689, filed on Feb. 13, 2019, now Pat. No. 11,351,726.

(30) Foreign Application Priority Data

Apr. 4, 2018    (EP) .................................... 18165729

(51) Int. Cl.
*B29C 64/393* (2017.01)
*B33Y 10/00* (2015.01)
(Continued)

(52) U.S. Cl.
CPC ............ *B29C 64/393* (2017.08); *B22F 10/28* (2021.01); *B22F 10/38* (2021.01); *B22F 10/85* (2021.01);
(Continued)

(58) Field of Classification Search
CPC .......... B22F 10/20; B22F 10/28; B22F 10/30; B22F 10/36; B22F 10/38; B22F 10/85;
(Continued)

(56) References Cited

U.S. PATENT DOCUMENTS 5,354,414 A    10/1994    Feygin
10,073,060 B2    9/2018    Redding et al.
(Continued)

FOREIGN PATENT DOCUMENTS

EP    3170590 A1    5/2017
EP    3205483 A1    8/2017

OTHER PUBLICATIONS

Mathieu et al., Preventing collisions between recoater mechanism and part in a SLM machine, 2017, Degree Project in Mechanical Engineering, Second Cycle, 30 Credits, p. 1-92. (Year: 2017).*
(Continued)

*Primary Examiner* — Kidest Bahta
(74) *Attorney, Agent, or Firm* — Dority & Manning, P.A.

(57) ABSTRACT

Apparatus (1) for additively manufacturing three-dimensional objects (2) by means of successive layerwise selective irradiation and consolidation of layers of a build material (3) which can be consolidated by means of an energy source (4), which apparatus (1) comprises an application unit (6) with at least one application element (7) adapted to apply build material (3) on a build plane (8), characterized in by a determination unit (12) that is adapted to determine contact information relating to a force acting on the at least one application element (7), preferably during an application process.

19 Claims, 2 Drawing Sheets

Figure 1:
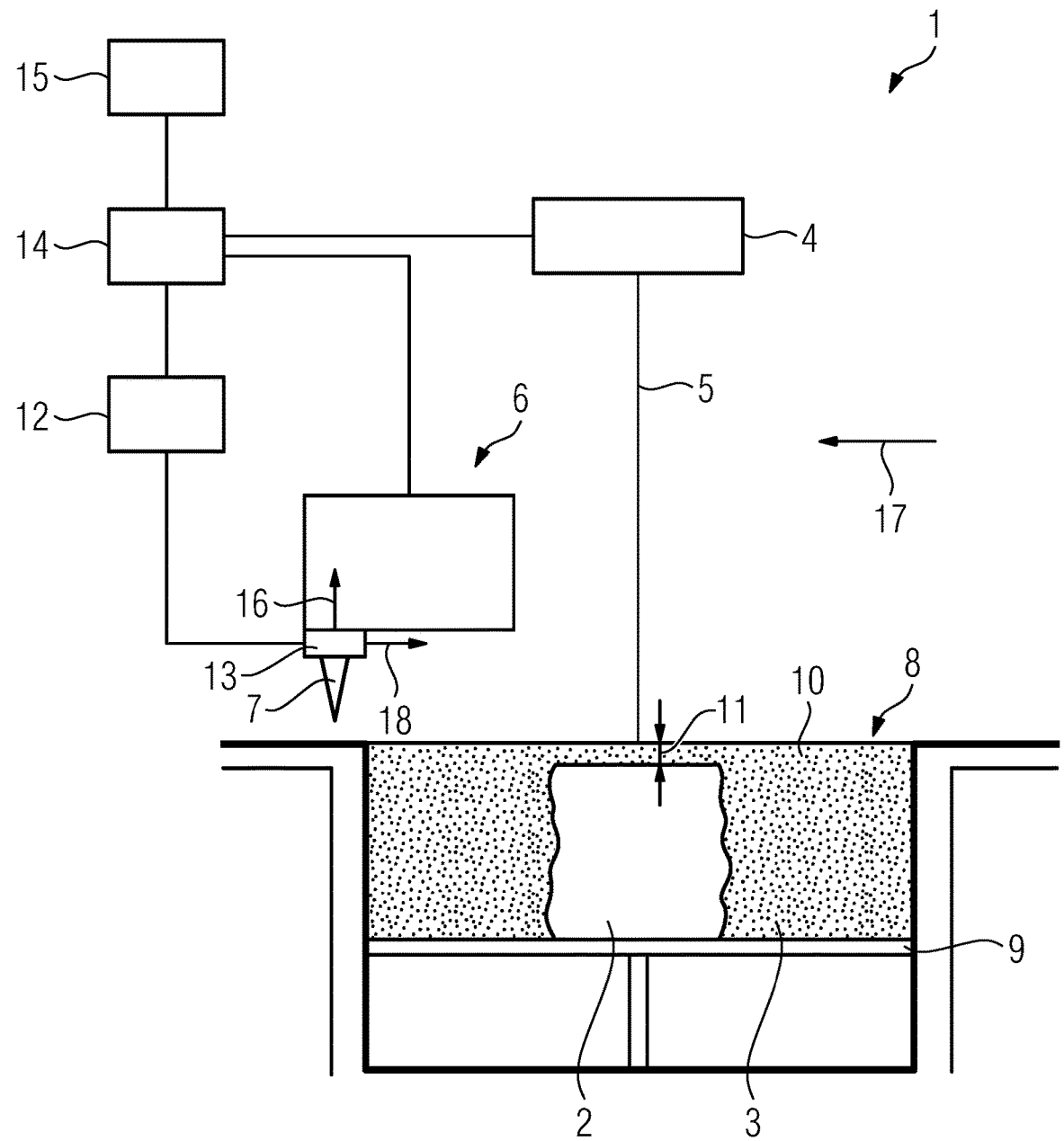

(51) Int. Cl.
*B29C 64/153* (2017.01)
*B29C 64/386* (2017.01)
*B29C 64/264* (2017.01)
*B29C 64/218* (2017.01)
*B29C 64/214* (2017.01)
*B33Y 50/00* (2015.01)
*B33Y 40/00* (2020.01)
*B29C 64/245* (2017.01)
*B22F 10/28* (2021.01)
*B22F 12/90* (2021.01)
*B22F 10/38* (2021.01)
*B22F 10/85* (2021.01)
*B33Y 30/00* (2015.01)
*B33Y 50/02* (2015.01)
*B29L 9/00* (2006.01)
*B22F 10/36* (2021.01)

(52) U.S. Cl.
CPC ............ *B22F 12/90* (2021.01); *B29C 64/153* (2017.08); *B29C 64/214* (2017.08); *B29C 64/218* (2017.08); *B29C 64/245* (2017.08); *B29C 64/264* (2017.08); *B29C 64/386* (2017.08); *B33Y 10/00* (2014.12); *B33Y 40/00* (2014.12); *B33Y 50/00* (2014.12); *B22F 10/36* (2021.01); *B29L 2009/00* (2013.01); *B33Y 30/00* (2014.12); *B33Y 50/02* (2014.12)

(58) Field of Classification Search
CPC ..... B22F 12/90; B29C 64/153; B29C 64/214; B29C 64/218; B29C 64/245; B29C 64/264; B29C 64/386; B29C 64/393; B29L 2009/00; B33Y 10/00; B33Y 30/00; B33Y 40/00; B33Y 50/00
See application file for complete search history.

(56) References Cited

U.S. PATENT DOCUMENTS

| | | |
|---|---|---|
| 11,192,296 B2 | 12/2021 | Mironets et al. |
| 2005/0280185 A1 | 12/2005 | Russell et al. |
| 2006/0157454 A1 | 7/2006 | Larsson |
| 2006/0219163 A1 | 10/2006 | Merot et al. |
| 2014/0348692 A1 | 11/2014 | Bessac et al. |
| 2015/0084240 A1 | 3/2015 | Shuck et al. |
| 2015/0115490 A1 | 4/2015 | Reinarz |
| 2016/0121397 A1 | 5/2016 | Aydin et al. |
| 2016/0325506 A1 | 11/2016 | Puigardeu Aramendia et al. |
| 2017/0136695 A1 | 5/2017 | Versluys et al. |
| 2017/0355147 A1* | 12/2017 | Buller .................. B23K 26/36 |
| 2018/0050494 A1* | 2/2018 | Coeck .................. B29C 64/165 |
| 2018/0154442 A1* | 6/2018 | Milshtein ................ B22F 10/36 |
| 2018/0200962 A1* | 7/2018 | Redding ................ B29C 64/40 |
| 2018/0200964 A1* | 7/2018 | Rockstroh ............. B29C 64/386 |
| 2018/0326712 A1* | 11/2018 | Raghavan ............. B33Y 50/02 |
| 2018/0348367 A1 | 12/2018 | Crear et al. |
| 2020/0101671 A1 | 4/2020 | Madigan et al. |

OTHER PUBLICATIONS

Weinberg et al., Design and Implementation of an Experimental and Numerical Framework for Powder Recoating Research in Selective Laser Melting, 2018, Massachusetts Institute of Technology, (Year: 2018).*

Xu et al. The Boom in 3D-Printed Sensor Technology, Jan. 31, 2017; www.mdpi.com/journal/sensors pp. 1-37. (Year: 2017).*

Simpson et al., Inexpensive Piezoelectric Elements for Nozzle Contact Detection and Build Platform Leveling in FFF 3D Printers; Nov. 25, 2017, RepRap Project, Foxham, Wiltshire SN15 4NB, UK, p. 1-14 (Year: 2017).*

* cited by examiner

APPARATUS FOR ADDITIVELY MANUFACTURING THREE-DIMENSIONAL OBJECTS

CROSS-REFERENCE TO RELATED APPLICATIONS

This application is a continuation of U.S. application Ser. No. 16/274,689, filed on Feb. 13, 2019, titled "APPARATUS FOR ADDITIVELY MANUFACTURING THREE-DIMENSIONAL OBJECTS", which claims priority to European Patent Application Serial No. 18 165 729.7 filed Apr. 4, 2018, the contents of which are herein incorporated in their entirety by reference.

DESCRIPTION

The invention relates to an apparatus for additively manufacturing three-dimensional objects by means of successive layerwise selective irradiation and consolidation of layers of a build material which can be consolidated by means of an energy source, which apparatus comprises an application unit with at least one application element adapted to apply build material on a build plane.

Such apparatuses that provide an energy source to selectively irradiate layers of build material to successively layerwise manufacture a three-dimensional object are generally known from prior art. Typically, build material can be applied using an application unit with at least one application element that is adapted to apply the build material on the build plane, e.g. by conveying build material from a dose unit to a build unit, where the build material can be distributed to form a uniform layer of build material that can afterwards be selectively irradiated via the energy source, in particular an energy beam, such as a laser beam or an electron beam.

Further, it is known from prior art that the quality of the application process is crucial for process quality and object quality, wherein a uniform application of build material in the build plane has to be ensured, because otherwise deviations in the object, such as impurities or deviations from a nominal mechanical behavior can occur. For example, if a layer of build material is unevenly applied on the build plane, deviations in the object can occur, as the layer that is selectively irradiated does not comprise the same height and geometry over the respective irradiated area.

It is an object of the present invention to provide an apparatus for additively manufacturing three-dimensional objects, wherein the application of build material can be improved.

The object is inventively achieved by an apparatus according to claim 1. Advantageous embodiments of the invention are subject to the dependent claims.

The apparatus described herein is an apparatus for additively manufacturing three-dimensional objects, e.g. technical components, by means of successive selective layerwise consolidation of layers of a powdered build material ("build material") which can be consolidated by means of an energy source, e.g. an energy beam, in particular a laser beam or an electron beam. A respective build material can be a metal, ceramic or polymer powder. A respective energy beam can be a laser beam or an electron beam. A respective apparatus can be an apparatus in which an application of build material and a consolidation of build material is performed separately, such as a selective laser sintering apparatus, a selective laser melting apparatus or a selective electron beam melting apparatus, for instance. Alternatively, the successive layerwise selective consolidation of build material may be performed via at least one binding material. The binding material may be applied with a corresponding application unit and, for example, irradiated with a suitable energy source, e.g. a UV light source.

The apparatus may comprise a number of functional units which are used during its operation. Exemplary functional units are a process chamber, an irradiation device which is adapted to selectively irradiate a build material layer disposed in the process chamber with at least one energy beam, and a stream generating device which is adapted to generate a gaseous fluid stream at least partly streaming through the process chamber with given streaming properties, e.g. a given streaming profile, streaming velocity, etc. The gaseous fluid stream is capable of being charged with non-consolidated particulate build material, particularly smoke or smoke residues generated during operation of the apparatus, while streaming through the process chamber. The gaseous fluid stream is typically inert, i.e. typically a stream of an inert gas, e.g. argon, nitrogen, carbon dioxide, etc.

As described before, the invention relates to an apparatus for additively manufacturing three-dimensional objects, in particular to the application of build material in an additive manufacturing process that is performed on the apparatus. The invention is based on the idea that a determination unit is provided that is adapted to determine contact information relating to a force acting on the at least one application element, preferably during an application process. Thus, the inventive apparatus comprises a determination unit or is connectable or connected with a determination unit. The inventive determination unit can determine contact information that relate to a force acting on, e.g. applied on, the at least one application element. Hence, a force that acts on the application element can be monitored. For example, the application element being moved over the build plane may come in contact with a previously applied or previously consolidated layer of build material, i.e. a part of the object that is additively built in the manufacturing process, wherein the contact results in a force applied or acting on the application element, respectively. Also, a force acts on the application element due to the application element conveying or distributing the build material in the build plane, e.g. pushing the build material over the build plane to distribute the build material and form a fresh layer of build material.

The determination unit may therefore, determine contact information and derive (measure) the force acting on the at least one application element. Thus, it can be determined whether the application process in which build material is applied on the build plane, is performed properly or whether irregularities are present in the application process. For example, it is possible that due to imperfections in a previously applied layer, for example spatters or an error in the three-dimensional object, such as a part of the object protruding the build plane, the application element comes in contact with the three-dimensional object (part of the previously consolidated layer, for instance) or with spatters of build material that landed on the build plane. If the application element comes in contact with three-dimensional object, a force different from a nominal force that would usually act on the application element in a proper application process may be applied on the application element. Usually, the force acting on the application element due to a contact between the object and the application element is significantly higher than a force acting on the application element in a regular application process.

In particular, it is possible that, if the application element comes in contact with the previously applied and consolidated layer of build material or with a structure of the apparatus, such as a carrying element carrying the build material, for instance, the application element and/or the previously applied layer of the object, can be damaged. In the worst-case, it is possible that the application element comes in contact with a previously applied layer of build material in that the application process cannot be continued, as the force that would be required to apply build material exceeds a maximum force with which the application element can be moved over the build plane. Alternatively or additionally it is possible that the application element and/or the previously built part of the object sustain damage due to the contact.

By way of the invention it is possible to determine the contact information and therefore, to determine the force that acts on the at least one application element. Preferably the determination is performed during an application process, wherein the application element applies build material on the build plane, wherein the contact information can be used to derive whether the application process is performed properly. Of course, it is also possible to move the application element independent of an application process, for example for performing a determination process, wherein the application element is moved over the build plane to determine the contact information solely.

The at least one determination unit may comprise at least one determination element for determining the contact information, which determination element is built as or comprises
 a force sensitive element, in particular a piezoelectric element and/or a strain gauge, and/or
 a magnetic element and/or
 a determination element adapted to determine a deviation of the application element from a neutral position, in particular a laser interferometer and/or
 an ultrasonic element.

Thus, the determination element may be built as or comprise a force sensitive element, in particular a piezoelectric element and/or a strain gauge. The force sensitive element, such as a piezoelectric element, may be used to derive/measure the force that acts on the application element. For example, a force acting on the application element may lead to a deviation of the application element from a nominal position. The force acting on the application element may also act on the force sensitive element that is coupled with the application element, for example deflecting the force sensitive element from a zero position. This may, for example, generate a voltage that can be measured to determine force acting on the application element.

Further, it is also possible to have a determination element that is adapted to determine a deviation of the application element from a neutral position, in particular to determine a distance between the application element and a reference position and/or a deviation from a defined distance. For example, a laser interferometer may be used, to determine the position of the application element or a deviation from a neutral position. For example, if the application element is deflected from a neutral position via the force acting on the application element, the determination element may be adapted to determine this deviation. Hence, the force acting on the application element may be derived from the results of the position and/or distance determination performed via the determination element.

According to another embodiment of the inventive apparatus, the determination unit may be adapted to determine the force acting on the application element, in particular against application direction and/or relative to the application direction, preferably during an application process. The term "application direction" may relate to the direction in which the application element is moved to convey and/or distribute the build material in an application process performed during the additive manufacturing process. Hence, the application direction may be deemed parallel to a machine axis. According to this embodiment, the determination unit can be adapted to determine a force that acts on the application element, for example against application direction and/or relative to the application direction, in particular perpendicular to the application direction. Hence, a force that is applied on the application element, for example with the application element moving or conveying or distributing build material in application direction or a force that acts on the application element perpendicular to the application direction.

If an irregularity is present in the additive manufacturing process, in particular in the application process, the force that acts on the application element in the case of an irregularity is different from the force that usually acts on the application element during a regular application step. Hence, an application element that comes in contact with a previously built layer of the object or the build plate, for instance, will receive the force that exceeds the force that usually is present in a regular application process. Thus, contact information can be determined via the determination of the force that acts on the application element, wherein it is possible to conclude on the effects on the process quality and/or the object quality via the contact information.

In particular, it is possible that the determination unit may be adapted to determine whether the application element is or will be or was in contact with a previously built layer of the three-dimensional object based on the contact information. As described before, it is possible to determine the force that acts on the application element. If the application element was or is in contact with a previously built layer of the object, the force that acts or acted on the application element in the situation will differ from a regular force acting on the application element in a proper application process. Thus, via the contact information the determination unit is adapted to determine whether the application element is or was in contact with a previously built layer of the three-dimensional object. It is also possible that the determination unit is adapted to determine whether the application element will be in contact with a previously built layer of three-dimensional object, wherein the contact information can be derived simultaneously while the application element is used to apply build material on the build plane. If a rise in the force acting on the application element is determined, it can be derived whether or when the application element will be in contact with a previously built layer of the three-dimensional object. Thus, it is possible to stop the application process before the three-dimensional object and/or the application element receive damage.

The inventive apparatus can further be improved in that a control unit is provided that is adapted to control the movement of the at least one application element, in particular dependent on the contact information. According to this embodiment, a control unit can be provided, for example a control unit integrated in the apparatus, which control unit is adapted to control the movement of the at least one application element. The control of the movement of the at least one application element may particularly be performed dependent on the determined contact information, wherein it is possible to use the determined contact information, i.e. to improve the application process. For example, dependent on the contact information, in particular the force that acts on the application element, it is possible to derive whether the application process is performed properly or whether an adjustment to the movement of the application element is necessary. The force that acts on the application element, in particular a force component oriented against the application direction, may indicate the amount of build material that is conveyed via the application element. If the amount of build material deviates from a nominal amount, surplus build material is increased that is wasted in the additive manufacturing process, wherein it is possible to adjust the amount of build material that is conveyed via the application element based on the contact information. It is also possible to adjust the position of the application element relative to the at least one previously built layer of build material, for example, if it is indicated via the contact information and, e.g., the application element is moved to close to the build plane.

The control unit may preferably be adapted to store the contact information in a data storage device. A data storage device can comprise or be built as any arbitrary device that is adapted to store the contact information, such as a hard drive. The stored contact information can later be read, i.e. used, for example for quality management purposes. For example, the stored contact information, preferably stored for every layer of build material that has been applied in the additive manufacturing process, can be used to verify that the application process has been performed without irregularities. Thus, the contact information can be used as quality indicator to ensure that the application element has not come in contact with other than non-consolidated build material that has been applied via the application element in the build plane.

The control unit may also be adapted to relate the contact information to the additive manufacturing process, in particular adapted to relate the contact information to at least one part of the three-dimensional object, in which the application unit is or was in contact with the corresponding layer of the object in the additive manufacturing process. In other words, it is possible that a direct relation between the contact information and the additively built object can be established. For example, it is possible to relate the contact information that has been determined in the additive manufacturing process to the at least one part of the three-dimensional object that was currently built when the contact information has been determined. For instance, the contact information that is determined during the application of build material in a specific layer of the three-dimensional object, can be related to that specific layer and indicate, whether an irregularity has been present during the application of build material. Based on the contact information, it is possible to verify that the quality of the application process and therefore, the object quality of the three-dimensional object that is built in the additive manufacturing process meets predefined requirements.

On the other hand, it is also possible to derive whether the application element received a regular force in the application process and therefore, it is possible to use the contact information to relate irregularities to specific layers of the object, for example to indicate, whether a post-process, such as a non-destroying analysis of the object is deemed necessary. It is also possible to monitor or, whether weld spatters or the like were present in the additive manufacturing process. Said weld spatters may be generated in a directly irradiated part of the build plane, in particular in a meltpool, with the energy source irradiating and heating build material in that the build material is liquidized and tends to form spatters. The spatters fall back on the build plane and can cause irregularities in the additive manufacturing process. If the application element comes in contact with those spatters, a deviation from a nominal force can be received or measured via the corresponding determination element. Thus, the contact information may give rise about whether spatters are/were present in the additive manufacturing process.

Further, the control unit may be adapted to generate a map, in particular a three-dimensional map, indicating, i.e. spatially resolving, the contact information in relation to the three-dimensional object. Thus, it is possible to have the control unit spatially resolve the contact information in relation to the geometry of the three-dimensional object. In particular, it is possible to spatially resolve the contact information for each layer of the three-dimensional object in a three-dimensional map. In other words, the three-dimensional map comprises the contact information for several layers of the object, wherein for each position of the application element it is possible to store the contact information, e.g. the force acting on the application element in this position, in the three-dimensional map. Thus, it can be identified in which position a deviation from a nominal force acted on the application element and in which position therefore, the application process may comprise an irregularity. Thus, dependent on the quality of the application process that is indicated via the three-dimensional map comprising the contact information, it can be decided whether a post-process, such as a computer tomography of the three-dimensional object needs to be performed.

Advantageously, the control unit may be adapted to generate quality information relating to the object quality of the three-dimensional object based on the contact information. As described before, the contact information may indicate whether the application process has been performed properly or whether irregularities happened in the application of build material via the application element. Thus, if no irregularities were found based on the contact information, the control unit may generate quality information indicating that the application process of the object has been performed properly. Otherwise, it is possible to generate quality information indicating that, for example, the application element came in contact with a previously built part of three-dimensional object or weld spatters or the like resulting in an increase of the force acting on the application element were determined.

According to another embodiment of the inventive apparatus, the control unit may be adapted to define and/or to receive a quality criterion defining a value or a value range dependent on which the quality information may be generated. For example, it is possible that a user defines a quality criterion for the contact information, such as a nominal force or a nominal force range, based on which quality information can be generated. In particular, if the contact information that is determined lies within the value range or meets the value that has been received or defined via the control unit, the quality information can indicate that the three-dimensional object is qualitatively acceptable or fulfills defined quality requirements. Otherwise, the quality information may indicate that a predefined quality requirement is not met or that a post-processing of the additively built object is necessary.

The control unit of the inventive apparatus may further be adapted to determine whether a replacement of the at least one application element is necessary, in particular to determine and indicate a necessary replacement. For example, if the contact information indicates that the application element was in contact with a previously built layer of the three-dimensional object, or a weld spatter, for instance, the application element may have received damage that can compromise future application processes in that it is necessary to replace the application element with a fresh or new application element, such as a recoater blade. Thus, dependent on the contact information the control unit can decide whether the application element has to be replaced. In particular, the force acting on the application element can be monitored and, if the force acting on the application element exceeds a predefined, in particular user-defined, value, a replacement of the application element can be deemed necessary or can automatically be performed, respectively.

The control unit may further be adapted to generate application information relating to the quality of an application process, dependent on the contact information. Thus, the control unit may derive whether the application process meets predefined application quality requirements based on the contact information. For example, if the contact information indicates that a force acting on the application element during an application process exceeded a predefined value, in particular a predefined force value was exceeded, the quality of the application process may be deemed as not fulfilling predefined quality requirements.

According to another embodiment of the inventive apparatus, the control unit may be adapted to adjust at least one process parameter dependent on the contact information, in particular a layer thickness and/or a movement parameter of the at least one application element and/or at least one irradiation parameter and/or at least one position of the at least one application element. Thus, it is possible to determine the contact information and adjust at least one process parameter dependent on the contact information. For example, the contact information may be used to derive information relating to the melting track, wherein the process parameters may be improved until the melting track meets predefined requirements. For example, irradiation parameters may be adjusted to find optimal parameters to improve the melting track. The melting track directly influences the force that acts on the application element during an application process of build material on the previously applied and consolidated layer of build material comprising the previously consolidated melting track. It is also possible to adjust various other process parameters other than irradiation parameters, such as application parameters, i.e. a layer thickness and/or a movement parameter, for example the velocity with which the application element is moved over the build plane.

Besides, the invention relates to a determination unit for an apparatus for additively manufacturing three-dimensional objects, in particular an inventive apparatus, as described before, wherein the determination unit is adapted to determine a contact information relating to a force acting on the at least one application element.

Further, the invention relates to a method for operating at least one apparatus for additively manufacturing three-dimensional objects by means of successive layerwise selective irradiation and consolidation of layers of a build material which can be consolidated by means of an energy source, in particular an inventive apparatus, as described before, wherein a contact information relating to a force acting on the at least one application element is determined.

Self-evidently, all features, details and advantages described with respect to the inventive apparatus are fully transferable to the inventive determination unit and the inventive method.

Figure 2:
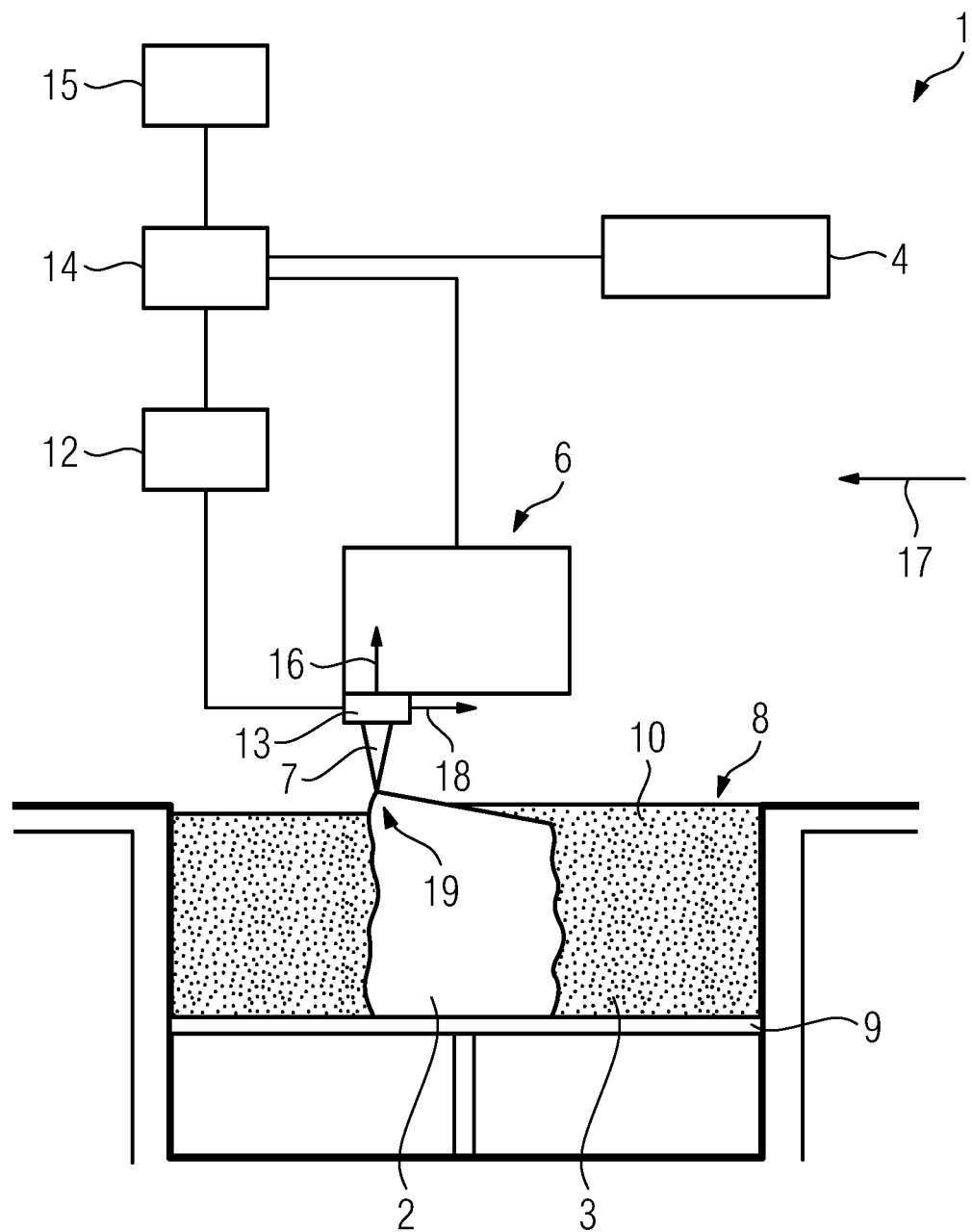

Exemplary embodiments of the invention are described with reference to the Fig. The Fig. are schematic diagrams, wherein FIG. 1 shows an inventive apparatus; and FIG. 2 shows an inventive apparatus.

FIG. 1 shows an apparatus 1 for additively manufacturing three-dimensional objects 2 by means of successive layerwise selective irradiation and consolidation of layers of a build material 3 which can be consolidated by means of an energy source 4. The apparatus 1 comprises an energy source 4 (irradiation device) that is adapted to irradiate the build material 3, e.g. adapted to generate an energy beam 5, such as a laser beam or an electron beam, for instance. The apparatus 1 further comprises an application unit 6 with an application element 7 that is adapted to apply build material 3 on a build plane 8. The build plane 8 is a plane in which build material 3 is arranged, wherein the build material 3 arranged in the build plane 8 can be selectively irradiated with the energy beam 5, dependent on the control of the energy beam 5 that is performed via the energy source 4.

In other words, the application unit 6 can guide the application element 7 over the build plane 8, e.g. a powder bed, in particular carried via a carrying element 9, to apply a fresh layer 10 of build material 3 onto a previously applied layer or onto the carrying element 9, respectively the carrying element 9 may also be deemed as "build plate". Thus, build material 3 can be applied in a layerwise manner, wherein the build material 3 is distributed as a layer 10 arranged in the build plane 8. Dependent on the movement of the carrying element 7, a layer thickness (indicated via arrow 11) can be defined.

The apparatus 1 further comprises a determination unit 12 that is adapted to determine contact information relating to a force acting on the application element 7, preferably during an application process. Thus, it is possible to determine a force that acts on the application element 7, preferably while the application element 7 is moved over the build plane 8 to convey and distribute build material 3 in the build plane 8, i.e. to form a fresh layer 10 in the build plane 8. Hence, via the application unit 6 fresh layers 10 of build material 3 can be applied successively and can be irradiated via the energy source 4 to selectively consolidate the build material 3 to form the object 2.

The application element 7 is coupled with a determination element 13, for example a piezoelectric element. Dependent on the force that acts on the application element 7 the determination element 13 is adapted to generate a signal that can be sent or can be received via the determination unit 12. Dependent on the determined force (or the correlated signal), the contact information can be determined. The determination element 13 is adapted to determine forces that act on the application element 7, for instance perpendicular (indicated via arrow 16) to an application direction (indicated via arrow 17) and/or against (indicated via arrow 18) application direction. The term "application direction" refers to the direction in which the application element 7 is moved to apply build material 3.

The apparatus 1 further comprises a control unit 14 that is adapted to control the movement of the application element 7, in particular dependent on the contact information. The determined contact information can further be stored in a data storage 15, for example stored as a three-dimensional map spatially resolving the contact information and thereby relating the contact information to at least one part of the three-dimensional object 2. The control unit 14 is further adapted to generate quality information relating to object quality of the three-dimensional object 2 based on contact information and/or to generate application quality relating to the quality of an application process in which a layer 10 of build material 3 is applied on the build plane 8.

Dependent on the contact information it is also possible that the control unit 14 may adjust at least one process parameter, for example the layer thickness 11 and/or a movement parameter of the application element 7 and/or at least one irradiation parameter and/or at least one position of the application element 7. Thus, it is possible to adjust process parameters and find optimal process parameters based on the contact information. For example, irradiation parameters based on which the energy source 4 generates the energy beam 5, such as spot size and/or power and/or intensity and/or a scan speed, can be varied, wherein an optimal process parameter can be determined dependent on the contact information. As the contact information relates to the force that is applied or that acts on the application element 7, an improvement of a process parameter can be found by determining the force acting on the application element 7. The at least one process parameter is improved, if a lower force acts on the application element 7 compared with a previous process parameter. The lowest force acting on the application element 7 compared with an initial process parameter may be deemed as optimal parameter.

FIG. 2 shows the apparatus 1 in another situation. Therefore, same reference signs are used for same parts. In the situation that is depicted in FIG. 2 the application unit 6, in particular the application element 7 is moved over the build plane 8 to apply a fresh layer 10 of build material 3. Due to deviations of the object 2, a part 19 of the object 2 is not even and sticks out of the build plane 8. Thus, the contact information may indicate an irregularity in the application process, in particular a comparatively higher force acting on the application element 7. The determined force may in particular comprise a force component perpendicular (arrow 16) to the application direction (arrow 17). Hence, the determination unit 12 determines the contact information and is adapted to send the contact information to the control unit 14 that is adapted to determine whether the application element 7 is or was in contact with the part 19 of the object 2. The part 19 may, in particular, be or comprise a previously built layer of build material 3.

Thus, the control unit 14 may decide whether a replacement of the application element 7 is necessary due to a potential contact between the application element 7 and the part 19. Based on the contact information it is further possible to generate quality information and store the contact information, in particular in the form of a three-dimensional map in the data storage device 15, as described before. Hence, it is possible to relate the contact information to the object 2 and spatially resolve the contact information for each layer 10 of the object 2. Thus, it is possible that, e.g. a user, can have the contact information visualized in the three-dimensional map, such as a three-dimensional model of the object 2 that was additively built in the additive manufacturing process performed on the apparatus 1. The user may therefore, derive from the contact information areas of the object 2 in which the contact information indicates irregularities the application process, in particular higher than usual forces acting on the application element 7.

Therefore, it is possible to decide whether a post-processing of the object 2, for example via non-destroying analysis, such as computer tomography, is deemed necessary. It is also possible to replace the application element 7, if a contact between the application element 7 and the part 19 has been determined to avoid a negative impact on future application process due to the application element 7 being damaged due to the contact with the object 2. Thus, a damaged application element 7 compromising further application processes, as the damage in the application element 7 degrades application quality, can be avoided by replacing the application element 7 in advance to the next application step.

Self-evidently, the inventive method may be performed on the inventive apparatus 1, preferably using an inventive determination device 12.

The invention claimed is:

1. An apparatus for additively manufacturing three-dimensional objects, the apparatus comprising:
    a recoater blade configured to apply build material on a build plane;
    a determination element configured to determine contact information relating to a force acting on the recoater blade during an application process, the force caused by a deviation in one or more previously consolidated layers of build material protruding from the build plane; and
    a control unit configured to:
        provide an indication prompting a replacement of the recoater blade based at least in part on the contact information, and
        adjust at least one process parameter dependent on the contact information, wherein the at least one process parameter comprises at least one of a layer thickness, a movement parameter of the recoater blade, and an irradiation parameter.

2. The apparatus according to claim 1, wherein the determination element comprises a force sensitive element.

3. The apparatus according to claim 1, wherein the determination element comprises at least one of a piezo-electrical element and a strain gauge.

4. The apparatus according to claim 1, wherein the determination element comprises at least one of magnetic element and an ultrasonic element.

5. The apparatus according to claim 1, wherein the determination element comprises a laser interferometer configured to determine the deviation from a neutral position.

6. The apparatus according to claim 1, wherein the determination unit is configured to determine a force acting on the recoater blade against an application direction of the recoater blade during an application process.

7. The apparatus according to claim 1, wherein the determination unit is configured to determine whether the recoater blade is or will be or was in contact with a previously built layer of the three-dimensional object based on the contact information.

8. The apparatus according to claim 1, wherein the control unit is configured to store the contact information in a data storage device.

9. The apparatus according to claim 1, wherein the control unit is configured to relate the contact information to the additive manufacturing process.

10. The apparatus according to claim 1, wherein the control unit is configured to relate the contact information to at least one part of the three-dimensional object, with which the recoater blade is or was in contact.

11. The apparatus according to claim 1, wherein the control unit is configured to relate the contact information to a corresponding layer of the one or more previously consolidated layers of build material in the additive manufacturing process.

12. The apparatus according to claim 1, wherein the control unit is configured to generate a map spatially resolving the contact information in relation to the three-dimensional object.

13. The apparatus according to claim 1, wherein the control unit is configured to generate a three-dimensional map spatially resolving the contact information in relation to the three-dimensional object.

14. The apparatus according to claim 1, wherein the control unit is configured to generate quality information relating to object quality of the three-dimensional object based on the contact information.

15. The apparatus according to claim 1, wherein the control unit is configured to define and/or to receive a quality criterion defining a value or a value range dependent on which the quality information is generated.

16. The apparatus according to claim 1, wherein the control unit is configured to adjust at least one process parameter dependent on the contact information.

17. The apparatus according to claim 16, wherein the at least one process parameter is at least one of a layer thickness, a movement parameter of the recoater blade, an irradiation parameter, and a positioning of the recoater blade.

18. The apparatus according to claim 1, wherein the control unit is configured to generate application information relating to a quality of the application process, dependent on the contact information.

19. A method for operating the apparatus according to claim 1, the method comprising:
   determining the contact information relating to the force acting on the recoater blade; and
   controlling, dependent on the contact information, movement of the recoater blade via the control unit,
   wherein the control unit is configured to determine whether replacement of the recoater blade is necessary based on the contact information.

* * * * *